United States Patent
Schilling et al.

(10) Patent No.: US 8,892,866 B2
(45) Date of Patent: *Nov. 18, 2014

(54) SECURE CLOUD STORAGE AND SYNCHRONIZATION SYSTEMS AND METHODS

(71) Applicants: Troy Schilling, Salt Lake City, UT (US); Subhashis Mohanty, San Diego, CA (US); Sara Mohanty, San Diego, CA (US)

(72) Inventors: Troy Schilling, Salt Lake City, UT (US); Subhashis Mohanty, San Diego, CA (US); Sara Mohanty, San Diego, CA (US)

(73) Assignee: Tor Anumana, Inc., San Diego, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 13/621,752

(22) Filed: Sep. 17, 2012

(65) Prior Publication Data

US 2013/0080765 A1    Mar. 28, 2013

Related U.S. Application Data

(60) Provisional application No. 61/539,368, filed on Sep. 26, 2011, provisional application No. 61/585,065, filed on Jan. 10, 2012.

(51) Int. Cl.
  *H04L 29/06*  (2006.01)
  *H04L 29/08*  (2006.01)

(52) U.S. Cl.
  CPC ........ *H04L 67/1095* (2013.01); *H04L 63/0428* (2013.01); *H04L 63/126* (2013.01); *H04L 2463/062* (2013.01)

USPC .......... 713/150; 713/165; 713/168; 713/176; 713/193; 726/30; 380/239

(58) Field of Classification Search
  CPC ................... G06F 2221/2107; G06F 11/1453; G06F 17/30156; H04L 63/0428; H04L 9/3236
  USPC .................... 713/165, 168, 176, 193; 726/30; 380/239
  See application file for complete search history.

(56) References Cited

U.S. PATENT DOCUMENTS

| | | | |
|---|---|---|---|
| 7,634,657 B1 * | 12/2009 | Stringham | 713/168 |
| 2005/0063541 A1 * | 3/2005 | Candelore | 380/239 |
| 2012/0159175 A1 * | 6/2012 | Yocom-Piatt et al. | 713/176 |

* cited by examiner

*Primary Examiner* — Brian Shaw
(74) *Attorney, Agent, or Firm* — Manuel de la Cerra

(57) ABSTRACT

A secure cloud storage and synchronization system and method is described that provides, among other things: (1) local password recovery, including a mechanism by which the user of the system can recover their password without having stored it on a remote server; (2) secure, private versioning of files, including a mechanism to privately store a version history of files on one or more remote servers in such a way that it is technically infeasible for anyone other than the legitimate owner to access any component of the file history; (3) secure, private de-duplication of files stored on one or more remote servers that reduces storage requirements by allowing for the storage of a single file when there are duplicates, even across users; and (4) secure, private sharing of files between users of the system that allows one user to share a file on the "cloud" with another user without deciphering or transporting the file.

21 Claims, 11 Drawing Sheets

7000 Example of Data-Sharing for De-Duplication

Table 1

|  | Alice | Bob | Charlie |
|---|---|---|---|
| Access to $D_1$ | Yes | Yes | No |
| Access to $D_2$ | No | Yes | Yes |

7200 Chart of Data Stored on EMS When Access is Granted According to Table 1

| Common | | Alice | Bob | Charlie |
|---|---|---|---|---|
| Fingerprint, $h_{pp}(D_1)$ | Secured data, $a(D_1)\#D_1$ | $K_a\#(a(D_1))$ | $K_b\#(a(D_1))$ | |
| Fingerprint, $h_{pp}(D_2)$ | Secured data, $a(D_2)\#D_2$ | | $K_b\#(a(D_2))$ | $K_c\#(a(D_2))$ |

EMS 20

FIG. 7B

10000 Comparison of Versioning Examples #1 and #2

9000 Versioning Example #2

| Download | Upload |
|---|---|
| Commit (to ver. $k+1$): $1 f_k$ | $f_{k+1}$ + 1 patch |
| Checkout (to ver. $k$): $F_N$ + ($N-k$) patches | nothing |
| Revert (ver. $N$ to $k$): $N-k$ patches | nothing |
| Update (ver. $k$ to $N$): $N-k$ patches (invert) | nothing |

9200
9300
9400
9500

8000 Versioning Example #1

| Download | Upload |
|---|---|
| Commit (to ver. $k+1$): $F_0$ + $k$ patches | 1 patch |
| Checkout (to ver. $k$): $F_0$ + $k$ patches | nothing |
| Revert (ver. $N$ to $k$): $N-k$ patches (invert) | nothing |
| Update (ver. $k$ to $N$): $N-k$ patches | nothing |

SECURE CLOUD STORAGE AND SYNCHRONIZATION SYSTEMS AND METHODS

TECHNICAL FIELD

The present invention relates to systems and methods for secure and private cloud data storage, transfer, sharing, updating, versioning, and synchronization among multiple devices.

BACKGROUND

Individuals now often use an ever-increasing number of computing devices, including desktop computers at multiple locations such as home and work, laptop computers, tablet computers, handheld computers such as smartphones, and other computing devices. Many of these devices are connectable with communication networks such as the Internet. The increasing use of different devices at different times and places has led to an increasing need for users to access their data and digital services from various remote computing devices. At the same time, the advent of "cloud" computing has led users to cause their computing devices to access data and digital services from various remote sources. Cloud computing refers generally to applications and services offered over the Internet. Since these services are often connected, users can share information between multiple systems and with other users. Non-limiting examples of cloud computing include online backup services, social networking services, personal data services, online applications, and hardware services, such as redundant servers, mirrored websites, and Internet-based computer clusters.

Accessing cloud computing from multiple computing devices presents numerous technical issues, including providing automated backup of a user's data from different computing devices, synchronization of data across devices, selective sharing of data with only certain friends and colleagues, and "versioning" of data (i.e., the ability to undelete or roll-back to a previous version of a document or other file no longer on one or more of the user's devices). Moreover, there is an increasing need for any solutions to these issues to be secure and private, so that only the user and the user's specific designees, if any, can access the user's data. Accordingly, it would be preferable that it be technically infeasible for even the solution provider to access the user's information.

SUMMARY

The present inventors have developed an integrated solution that addresses all of these issues and more, all while strictly maintaining the privacy of the user's data. These solutions are alternatively referred to herein individually and collectively as the system, method, or application. In various example embodiments the system may allow a user to mark any file on any of his/her devices for backup and synchronization, and mark any directory on any of his/her devices for backup and synchronization. This may provide backup/synchronization of all files in the marked directory, and recursive marking of all subdirectories (and the files contained therein) of the marked directory. Files subsequently added to the marked directory may likewise be backed up and synchronized in these embodiments.

Example embodiments of the system may also allow a user to revert to a previous version of any of their synchronized files, and/or share files with other users. Synchronized files may be synchronized both with the files on the "cloud" and those on the user's registered devices (storage and bandwidth resources on those devices permitting).

Various embodiments of the system may include any or all of the following aspects: mechanisms that encrypt user data on remote servers; mechanisms that protect user data on user devices; mechanisms that allow users to securely and privately share data with other users; mechanisms that enable a user to recover his/her password without participation from the remote servers; mechanisms that compute, transfer and store a diff/patch specification on the remote servers; and mechanisms that enable file de-duplication, this is, mechanisms that enable the solution provider to store a single version of a file common to two or more unrelated users.

Accordingly, provided herein are various systems and methods, including but not limited to systems and methods that provide: (1) local password recovery that provides a mechanism by which the user of the system can recover their password without having stored it on a remote server; (2) secure, private versioning that provides a mechanism to privately store a version history of files on one or more remote servers in such a way that it is technically infeasible for anyone other than the legitimate owner to access any component of the file history; (3) secure, private de-duplication of files stored on one or more remote servers that reduces storage requirements by allowing for the storage of a single file when there are duplicates, even across users; (4) secure, private sharing of files between users of the system that allows one user to share a file on the "cloud" with another user without deciphering or transporting the file.

Other aspects of the invention are disclosed herein as discussed in the following Drawings and Detailed Description.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views. It will be understood that certain components and details may not appear in the figures to assist in more clearly describing the invention.

FIG. 7B is a table and corresponding chart showing the location of data in accordance with various example embodiments of the invention.

FIG. 10 is a comparison of the flow diagrams of FIGS. 8 and 9 in accordance with various example embodiments of the invention.

DETAILED DESCRIPTION

Figure 1:
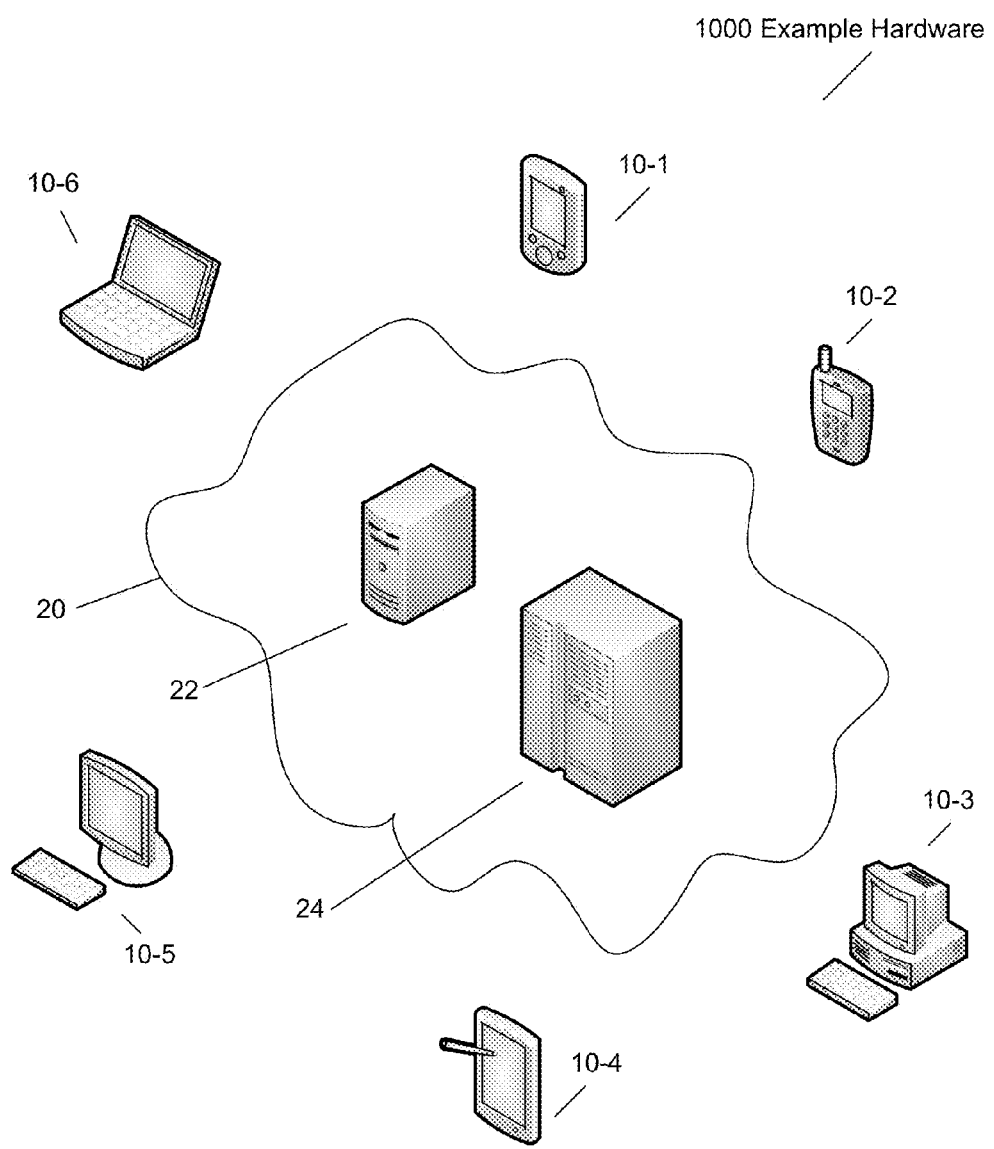
FIG. 1 is a block diagram of a system in accordance with various example embodiments of the invention, showing example hardware.

Following is a non-limiting written description of example embodiments illustrating various aspects of the invention. These examples are provided to enable a person of ordinary skill in the art to practice the full scope of the invention without having to engage in an undue amount of experimentation. As will be apparent to persons skilled in the art, further modifications and adaptations can be made without departing from the spirit and scope of the invention, which is limited only by the claims.

DEFINITIONS

The following definitions will be used throughout this description except where otherwise noted:

Entity Management System (EMS): The "cloud" server—or set of servers—owned and/or operated and/or used in certain embodiments by a service provider to store user data, provide connectivity between user devices, and provide other data services.

Key Derivation Function (KDF): A function that takes a "passphrase" (an arbitrary-length byte array) as input, and generates a symmetric encryption key as output. The KDF may take other input parameters such as, for example, salt and/or an iteration count, or any other suitable parameters.

diff: A computational algorithm that computes the difference between two or more files. The diff of two files depends on the order of those files. For example, diff($F_1$, $F_2$) is, in a sense, the inverse of diff($F_2$, $F_1$). The output of diff($F_1$, $F_2$) is a set of instructions required to obtain file $F_2$ from file $F_1$ ("file" here simply mean an array of bytes). A diff may provide multiple types of outputs, such as patch instructions, described below. For reasons of efficiency, the diff of two files may depend on the type of those files.

patch: A computational algorithm for transforming one file into another, given a set of patch instructions. Notationally, patch($F_1$, $P_{12}$)=$F_2$, where $P_{12}$=diff($F_1$, $F_2$). The following notation will also be used herein: $P_{12}(F_1)$=patch($F_1$, $P_{12}$).

device RSA key pair: In cryptography, RSA (which stands for Rivest, Shamir and Adleman who first publicly described it) is a well-known algorithm for public-key cryptography. In various embodiments, an RSA key pair is associated to each of the user's devices. In such embodiments, the user's devices generate their own RSA key pairs, and the user's device transfers the public key to EMS and securely stores the private key locally.

user RSA key pair: A single RSA key pair is associated with each user (in addition to the RSA key pair associated with each of the user's devices). In various embodiments, the first of the user's devices to register itself with EMS generates the user RSA keys.

root key: The user's "root key" is a single symmetric key associated with a single user. It is generated by the first device registered with the system. In various embodiments, EMS will not be capable of computing a user's root key.

root protection key: The root protection key (different from the "root key") is obtained from the user's password by use of a KDF. In various embodiments, the root protection key is used to encrypt the root key before it is stored on EMS. The root protection key may also be used to protect sensitive user data on the user's devices.

de-duplication (de-dup): A single user may possess two files that are bit-for-bit identical (not including inode information). Similarly, two users may possess files that are bit-for-bit identical. De-dup refers to a mechanism by which such duplicate files can be stored as a single copy of a single file to decrease storage requirements. The present system and method implements de-dup while stringently maintaining each user's security and privacy.

logical file: An array of bytes representing the contents of an actual file (not including inode information). By definition, there is a single logical file associated with the current version of a synchronized file, despite that there may be multiple actual files on EMS and on one or more user devices.

Notation

If K denotes an encryption key and D denotes a blob of data, K#D denotes encipherment of D using the encryption key K. The type of encryption algorithm is implied by the nature of the key. If K is a public RSA key, asymmetric RSA encryption is understood. If K is intended as a symmetric key, the specific encryption algorithm is not specified herein, but the Advanced Encryption Standard (AES) with cipher block chaining is typically preferred.

Example Architecture

With reference to FIG. 1, example architecture 1000 is shown. One or more users (not shown) may use a plurality of computing devices 10, including by way of example and not limitation, personal data assistants or PDA's 10-1, smart phones 10-2, desktop computers, for instance at work and home 10-3, 10-5, tablet computers 10-4, and laptop computers 10-6. It is understood that these are just examples of computing devices 10 and that other types of computer devices 10 are available and will be forthcoming in the future. Computing devices 10 are typically connectable by wire and/or wirelessly with communication networks such as the Internet, as represented by cloud 20. The Internet or cloud 20 comprises a vast infrastructure facilitating digital communication, processing, storage, and other data services and features as is known in the art. Use of computing devices 10 may cause a user's data to be stored in the cloud 20, for instance in one or many servers 22 or other computer systems 24. In the present system, the EMS exists in the cloud 20 and is referred to synonymously with the cloud 20, and comprises one or more servers 22 and/or other computer systems 24 adapted and programmed to run the system and Method as described herein.

Example of Key Creation

Figure 2:
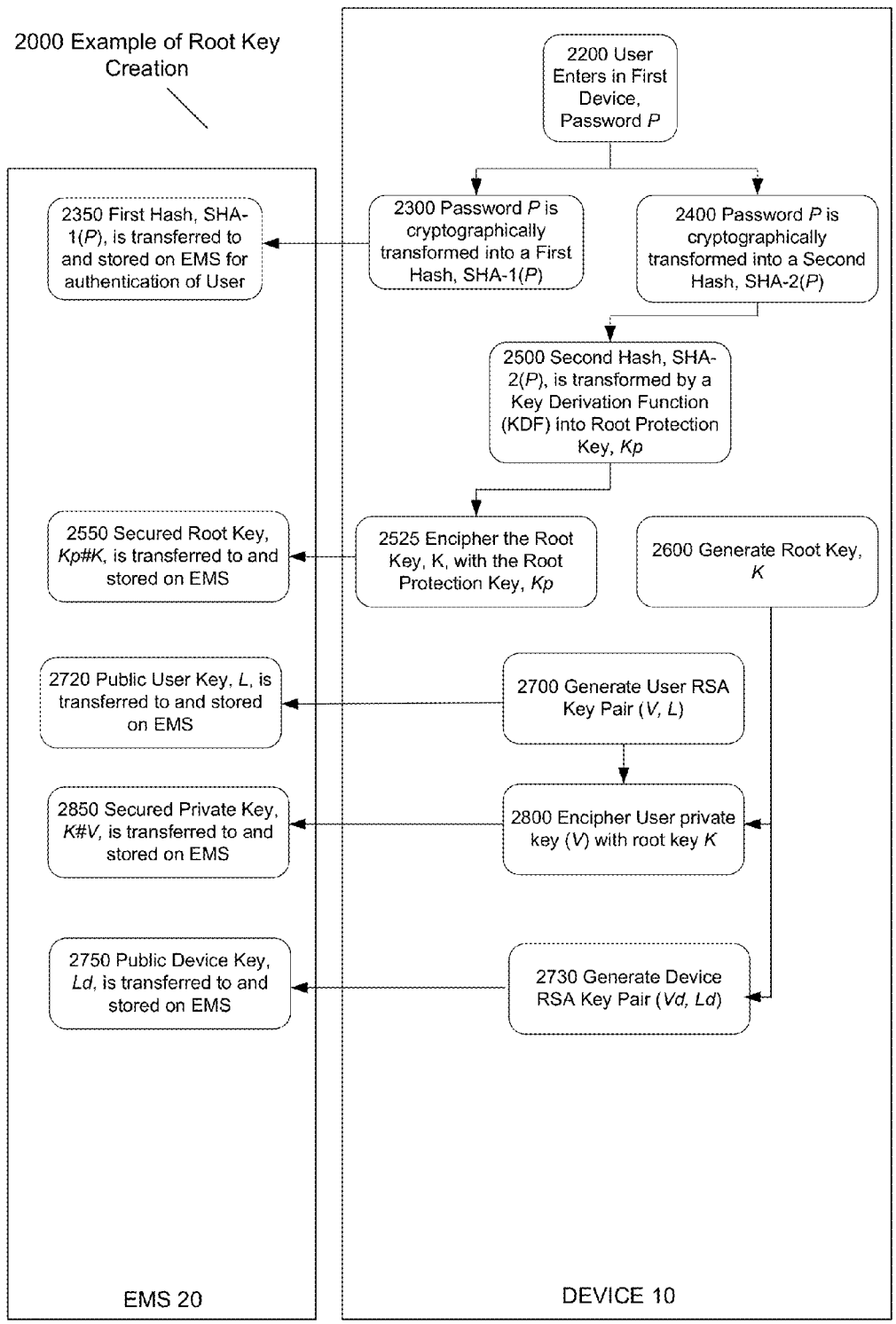
FIG. 2 is a flow diagram of a system in accordance with various example embodiments of the invention.

With reference to FIG. 2, an example embodiment of Key Creation 2000 will be described. Initially at step 2200, a user (not shown) enters a new Password P into a first device 10. At steps 2300 and 2400, the system operating on device 10 cryptographically transforms Password P into a First Hash, SHA-1(P), and separately into a Second Hash, SHA-2(P). First Hash SHA-1(P) is then transferred from device 10 to EMS 20 where it is stored for future authentication of the user. At step 2500, the system operating on device 10 transforms Second Hash, SHA-2(P) into Root Protection Key, Kp, using a Key Derivation Function (KDF). At step 2600 the system operating on device 10 generates the Root Key, K—generally a symmetric key; this is done only once per user (on the user's first device). At step 2525, the system operating on device 10 enciphers the Root Key (K) with the Root Protection Key, Kp, creating the Secured Root Key, Kp#K, which is then (optionally) transferred to and stored on EMS 20 at step 2550.

At step 2700, the system operating on device 10 uses an RSA algorithm to generate a User RSA Key Pair; with private key denoted V, and public key denoted L. The User Private Key, V, is enciphered with Root Key, K, by the system operating on device 10 into a Secured Private Key, K#V, at step 2800. The Secured Private Key, K#V, is (optionally) transferred to and stored on EMS 20 at step 2850. The Public User Key, L, is then transferred to and stored on EMS 20 at step 2720.

In addition to generating User Keys, V, L, the system operating on device 10 also uses an RSA algorithm to generate public and private device keys. At step 2730, the system operating on device 10 uses an RSA algorithm to generate a Private Device Key Pair; with private key denoted Vd, and public key denoted Ld. Ld is transferred to and stored on EMS 20 at step 2750.

It is understood that additional or different steps may be taken in other example embodiments of key creation 2000, including use of different or additional algorithms for data transformation. Further details regarding these steps are provided below.

User Password Storage

In various embodiments including the one shown in FIG. 2, EMS 20 shall store (only) a cryptographic transform, i.e., "hash," of the user's password. In the examples herein, it will be assumed that the SHA-1 hash of the user's password is stored on EMS 20, though another cryptographic hash function could be used. SHA stands for "secure hash algorithm", and SHA-1 and SHA-2 are cryptographic hash functions published by the NIST as a U.S. Federal Information Processing Standard. In these example embodiments, the SHA-1 hash (and quantities derived from it) of the user's password is the only quantity derived directly from the user's password that EMS 20 may use for any purpose.

If it is necessary for the client application to store, or otherwise use the user's password for privacy purposes, the use of that password by the client applications (both the "client" and "server" executing on the user's devices 10) is preferably only in terms of a second cryptographic hash of the password. The hash function used for this purpose may be independent of the first SHA-1 hash function described above. For this purpose, the SHA-2/256 hash (referenced below as SHA-2) of the user's password may be used as shown in example step 2400, though another hash function (independent from that used by EMS) could be used. With the exception of the password recovery data discussed herein, in these example embodiments the SHA-2 hash (and quantities derived from it) of the user's password is the only quantity derived from the user's password that the client applications may use for any purpose.

Key Derivation Function

A key derivation function (KDF) may be used in various places for generation of a symmetric key from a password or passphrase. For example, a KDF may be used that is consistent with PKCS 5, V2 KDF, as documented in *PKCS #5 v2.0: Password-Based Cryptography Standard*, RSA Laboratories, Mar. 25, 1999. When a key is derived using a KDF, random salt is generated. It is preferable that the salt consists of at least 16 bytes. The KDF may also take an iteration count as input. The purpose of this iteration count is to increase the complexity of computing the key, which complicates dictionary attacks. It is preferable that the iteration count be at least 1,000.

If a blob of data should be encrypted with a key obtained from a KDF, and if the system must store this blob for future recovery, and if recovery should be facilitated using only the associated password, the salt and iteration count may both be stored in plaintext (though perhaps obfuscated) along with the encrypted blob.

Root Key And Root Protection Key

In various example embodiments, the user's root key (an example of which is described above with respect to step 2600) may be: (1) randomly generated by the first user device registered by the user; (2) of cryptographic quality; and (3) preferably at least 32 bytes long.

The user's root key is important for protecting the user's data (along with the user's password, device private RSA key, and user private RSA key). The root key is preferably not stored in plaintext on EMS 20, so that it shall not be feasible for anyone (or anything) other than the user (or the user's devices) to derive the user's root key.

The root key may be securely stored on EMS 20 for retrieval by only the user. This can be accomplished by using any suitable system, including one using the following steps. An encryption key (preferably at least 32 bytes long) is obtained using a KDF as previously described, with the hash (for instance SHA-2) of the user's password as input (this is the password associated with the user's account, which is used for authentication with EMS 20). This is the root protection key, as illustrated in step 2500.

The root key is encrypted using the above root protection key, as shown in step 2600. AES encryption, which is well known in the art, may be used, for example. The secured root key is transmitted to EMS 20 for storage, as shown in steps 2525, 2550.

The root protection key (generated in step 2500) shall typically not be used for any purpose other than that described here, except possibly for securing sensitive data on the user's device 10. The root protection key should not be stored in plaintext. The root protection key should not be transferred from the user's device 10, and should be securely deleted or zeroized from the RAM or other memory of the device 10 as soon as possible after it is computed. Otherwise, the various hashes and keys generated on device 10 may be stored on device 10, unless otherwise noted.

The only dependencies that the EMS 20 database should have on the user's password are: (1) the encrypted root key; and (2) the hash (SHA-1 preferred) used for the purpose of user authentication.

After the first device 10 is registered as shown for instance in example 2000, it shall store the root key in application storage space, protected for access by the user. When subsequent devices are registered, they shall obtain the user's secured root key from EMS 20 (such as Kp#K shown in step 2550), decipher it, and store it in application storage space, protected for access by the user.

If and when the user changes his/her EMS password, the root key may be encrypted with the new password, and uploaded to EMS 20 for storage, for instance as described above with respect to Key Creation 2000.

Figure 3:
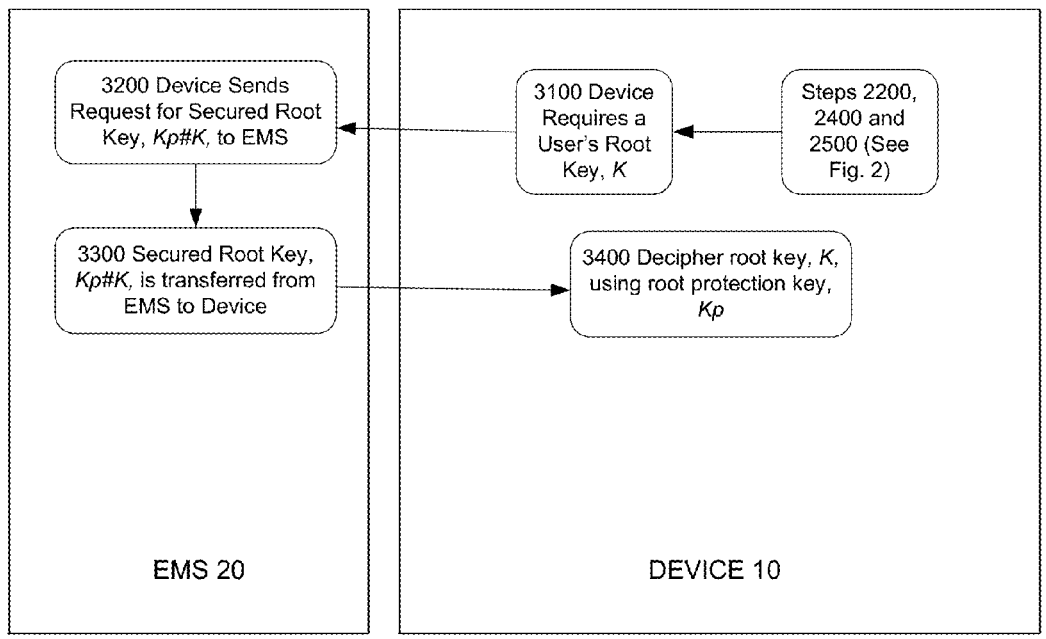
FIG. 3 is a flow diagram of a system in accordance with various example embodiments of the invention.

A device 10 should usually have a local copy of the user's root key, K. However, if a device 10 (for example, a web client or a new device) requires the user's root key, K, the device 10 may reverse the above process, for instance as shown in process 3000 in FIG. 3, where: (1) the system operating on device 10 sends a request to EMS 20 for the secured root key, Kp#K, as shown in steps 3100, 3200; (2) EMS 20 transfers the secured root key, Kp#K, from EMS 20 to device 10, as shown in step 3300; (3) the system operating on device 10 computes the root protection key, Kp, from the password, as shown in step 2500; (4) the system operating on device 10 deciphers the root key, K, using the root protection key Kp, as shown in step 3400.

Note that a change in the user's password does not require that any of the user's data be re-encrypted; only the user's root key is re-encrypted upon password change as shown in method 2000. Thus, a user password change is a simple and quick operation.

User RSA Keys

A single RSA key pair is associated with each user (in addition to the RSA key pair associated with each of the user's devices). The first of the user's devices 10 to register itself with EMS 20 generates and stores the user RSA keys, as shown in step 2700 in FIG. 2. The user public RSA key is typically stored on the associated device 10. Likewise, the user private RSA key is typically securely stored on the associated device 10 for future access.

The primary purpose of the user RSA key pair is to provide a mechanism for users to securely/privately exchange information with one another in a manner that is device-independent. Data sharing is discussed further later in this description.

Device RSA Keys

The device RSA keys are used for device authentication, and to facilitate symmetric key transport between user devices 10. Their generation and storage are illustrated in step 2730, in FIG. 2. The device public RSA key is typically stored on the associated device 10. The device private RSA key is typically securely stored on the associated device 10 for future access.

Password Creation and Recovery

In the examples shown herein the user must separately store or otherwise remember her or his password, because it is not stored on EMS 20. To avoid inoperability of the system due to lost passwords, each of the user's devices 10 may provide a password recovery feature. In various embodiments this is an option that may be enabled or disabled by the user. Password recovery will typically operate locally, because EMS 20 does not participate in this function.

Figure 4:
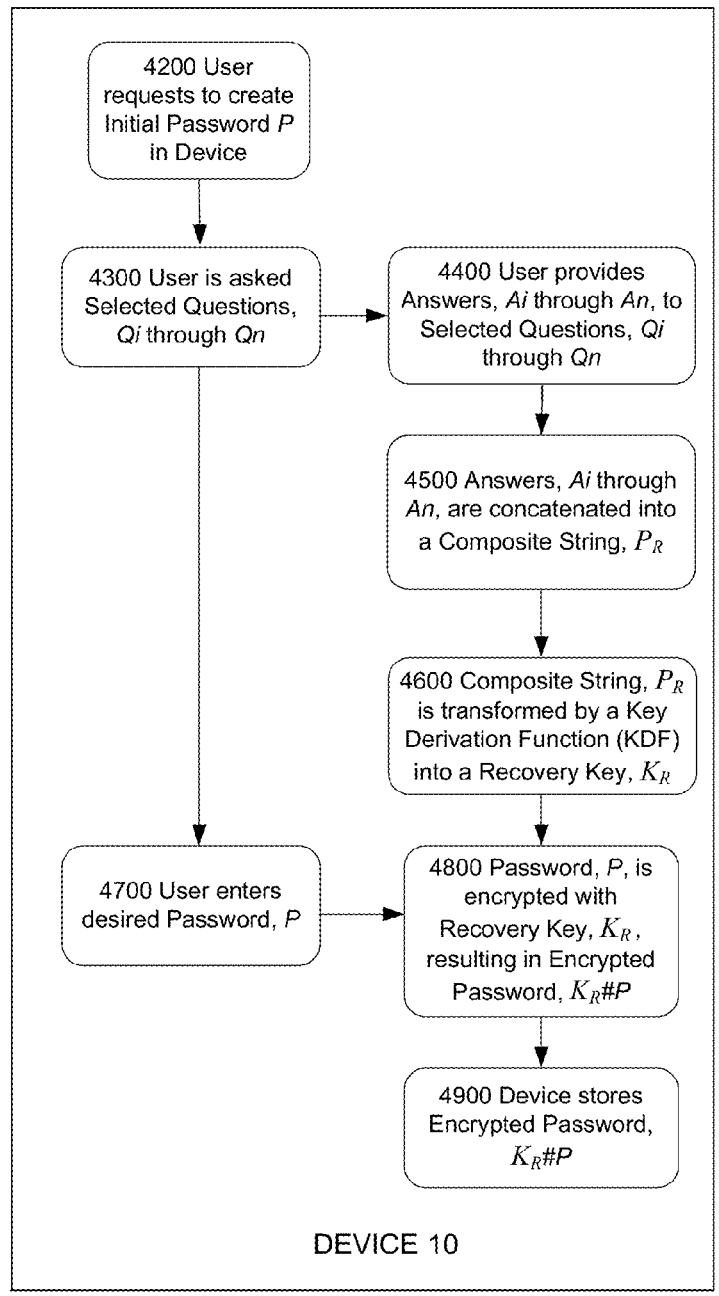
FIG. 4 is a flow diagram of a system in accordance with various example embodiments of the invention.

One example embodiment of a password creation and recovery feature 4000 running on an application on device 10 is illustrated in FIG. 4, where the client requests to create a password P at step 4200, and is then asked a number of recovery questions at step 4300, such as: "What was the name of your first pet?"; "In what city were you born?"; "What is your mother's maiden name"; and the like. In step 4400, the user selects, and provides answers to, at least $N_{MIN}$ questions, where $N_{MIN} \approx 4$. In addition to the pre-loaded questions, the application may provide an option for the user to add an arbitrary text question (arbitrary other than constraints such as maximum length), and the corresponding answer. This defines $N_R > N_{MIN}$ pair of strings: $\{Qi, Ai|0<i<N_R\}$, where the Qi are the questions and Ai are the secret answers. If the user adds custom questions, those questions may be stored, for instance on a fixed drive/sdcard, and protected for secure access by the application only.

At step 4500, the application running on device 10 may then generate the following composite string: $P_R = Q_1|A_1|Q_2|A_2| \ldots Q_{NR}|A_{NR}$, where the symbol "|" denotes concatenation. At step 4600, $P_R$ is used as the "passphrase" input to a Key Derivation Function (KDF), the output of which is an encryption key (the recovery key) $K_R$. The application then prompts the user to enter his/her desired password, P, at step 4700. The application may require that the user enter P twice, and verify that the two entries are identical. The user's plaintext password, P, is then encrypted with $K_R$ at step 4800, and the result, $K_R\#P$, is stored, for instance on a fixed drive/sdcard at step 4900, and is protected for secure access by the application only.

Password recovery will now be discussed. In various example embodiments the password is recovered by reversing the process 4000. For example, on request the user may be prompted for their secret answers provided in step 4400, then steps 4500 and 4600 may be repeated to generate the recovery key, $K_R$, after which step 4800 can be run in reverse to decipher the encrypted password $K_R\#P$, yielding the plain text password, P, which is then displayed to the user on device 10. After having recovered the user's password, the memory in which the secret answers, recovery passphrase, recovery key and password are stored are typically deleted and zeroized.

Recovery of the user's password may be associated with a verification method by which the algorithm may determine that the recovered password is correct (or is likely correct). This may be as simple as a check that the deciphered password consists of only ASCII characters, though any other suitable method may be used. The above password creation and recovery system is one example embodiment. Other embodiments may include fewer or additional or different steps, as appropriate.

Application Data Protection Model (Local Storage)

Proprietary data relating to the application that must be stored on the user's device 10 (e.g., data that reveals the nature of the applications protocols, licensing mechanisms, etc.) may be protected using any suitable method, including but not limited to the following steps. When relevant and possible, any file containing such data may be owned (in the UNIX sense) by the application. A user might in certain embodiments be able to access application files by rooting or jailbreaking their device. In addition to storage of proprietary application data in application-specific storage, all such files may be encrypted using any suitable mechanism.

User Data Protection Model (Local Storage)

Data that is owned by the user, that must be stored on the user's device 10, and that need not be accessed outside the application, but that is of sufficient sensitivity to be afforded special protection, may be encrypted using the user's root key, K. The root key, K, should be stored securely (or obfuscated) on the device.

User Data Protection Model (Cloud Storage)

Figure 5:
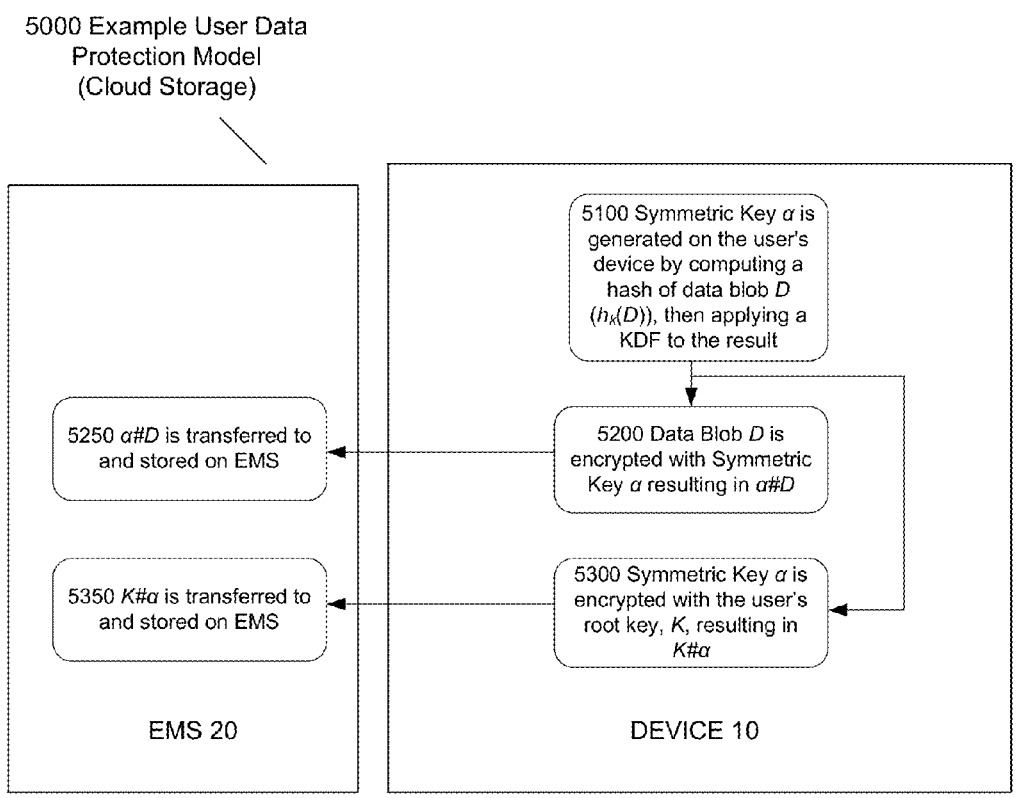
FIG. 5 is a flow diagram of a system in accordance with various example embodiments of the invention.

The basic model for protection of user data stored on EMS 20 is shown as process 5000 in FIG. 5, and is described below. A data blob D may be securely stored on EMS 20 as follows. At step 5100 a symmetric key α is generated on the user's device to encrypt the blob D, for instance as follows: A digest $h_K(D)$ of the blob D may be computed, where $h_K$ denotes an independent cryptographic hash function (independent of $h_{FP}$, discussed herein). The hash (SHA-1 preferred) of the blob D is typically computed on the user's device 10. Any other suitable cryptographic hash function could be used. The result is a "pre-key" $\eta = h_K(D)$. The key α is obtained by use of a KDF acting on the pre-key η. That is, $\alpha = \alpha(D) = KDF(h_K(D))$.

At step 5200, the blob D is encrypted with the key α (preferably using AES in CBC mode with PKCS-5 padding), and the result is denoted α#D. Then at step 5300, the key α is encrypted with the user's root key K (preferably using AES in CBC mode with PKCS-5 padding), and that result is denoted K#α.

As shown in steps 5250, and 5350, α#D and (optionally) K#α are transferred to, and stored on, EMS 20. A blob identifier (e.g. obtained from a hash function independent of $h_K$) may also be transmitted to, and stored on, EMS.

Extraction of data D by the user requires knowledge of the encryption key α. This can be obtained by downloading the secured key K#α to the user's device 10, and then deciphering it locally using the user's root key K. If the user's root key K is not available on the local device 10, it can be obtained as described previously with respect to process 3000 shown in FIG. 3.

Data Sharing

Figure 6:
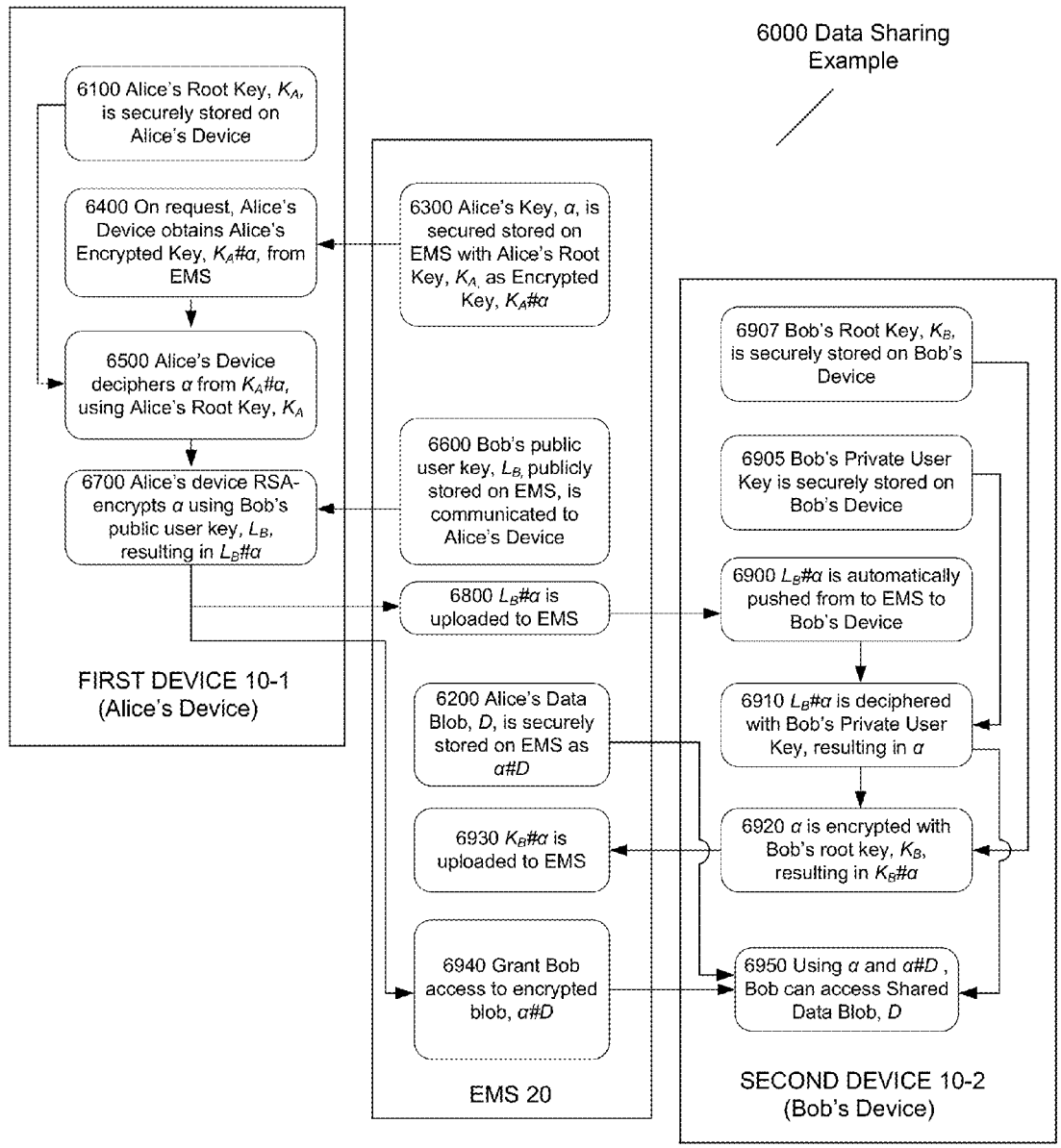
FIG. 6 is a flow diagram of a system in accordance with various example embodiments of the invention.

The above model accommodates data sharing as shown in example 6000 in FIG. 6 and described below. In this non-limiting example, Alice, using a first device 10-1, has a data blob D that she wants to share with Bob, who is using a second device 10-2. The data blob D is secured on EMS 20 with Alice's AES key $\alpha$, as shown at 6200. As shown in step 6100, Alice's Root Key, $K_A$, is securely stored on Alice's device 10-1. And as shown in step 6300, Alice's key $\alpha$ is securely stored on EMS 20, encrypted with Alice's root key $K_A$. In order for Alice to share D with Bob, her key $\alpha$ must be transported to Bob on second device 10-2. This may be done as follows:

Step 6400, Alice's device 10-1 obtains the encrypted key $K_A\#\alpha$ from EMS 20.

Step 6500, Alice's device 10-1 deciphers $\alpha$ using Alice's root key $K_A$.

Step 6600, Bob's public user key, $L_B$, publicly stored on EMS 20, is communicated to Alice's device 10-1 upon request therefrom.

Step 6700, Alice's device 10-1 RSA-encrypts $\alpha$ using Bob's public user key, $L_B$, resulting in $L_B\#\alpha$.

Step 6800, the above result, $L_B\#\alpha$, is uploaded to EMS 20.

Step 6940, EMS documents permission for Bob to access encrypted blob, $\alpha\#D$, which will be transmitted to Bob's device upon request.

Step 6900, if Bob's device 10-2 (or any other of Bob's devices 10) is online, $L_B\#\alpha$ may be automatically pushed from EMS 20 to the online device 10-2.

Step 6910, $L_B\#\alpha$ is deciphered with Bob's private user key 6905, resulting in $\alpha$.

Step 6920, $\alpha$ is encrypted with Bob's root key, $K_B$ 6907, resulting in $K_B\#\alpha$.

Step 6930, the above result, $K_B\#\alpha$, is then (optionally) uploaded to EMS 20.

Step 6950, Bob's device, 10-2 may then compute the shared data blob D by deciphering $\alpha\#D$ with the encryption key $\alpha$ obtained in step 6910.

If none of Bob's devices 10 is online, steps 6900-6950 would be performed when the next of Bob's devices 10 comes online or otherwise in digital communication with EMS 20.

De-Duplication

De-duplication refers to securely and privately storing files (such as simply byte arrays) for several users while minimizing duplication of files and/or byte arrays. Secure and/or private storage means in various embodiments that the user's files are encrypted before storage on the system, and the encryption key is unknown to the system provider.

In various embodiments, storing files without duplication means that when a user requests that a file be stored on the system (such as EMS 20), if the contents of that (plaintext) file already reside on the system (encrypted with a key unknown to the system provider), the system does not store a duplicate.

Figure 7A:
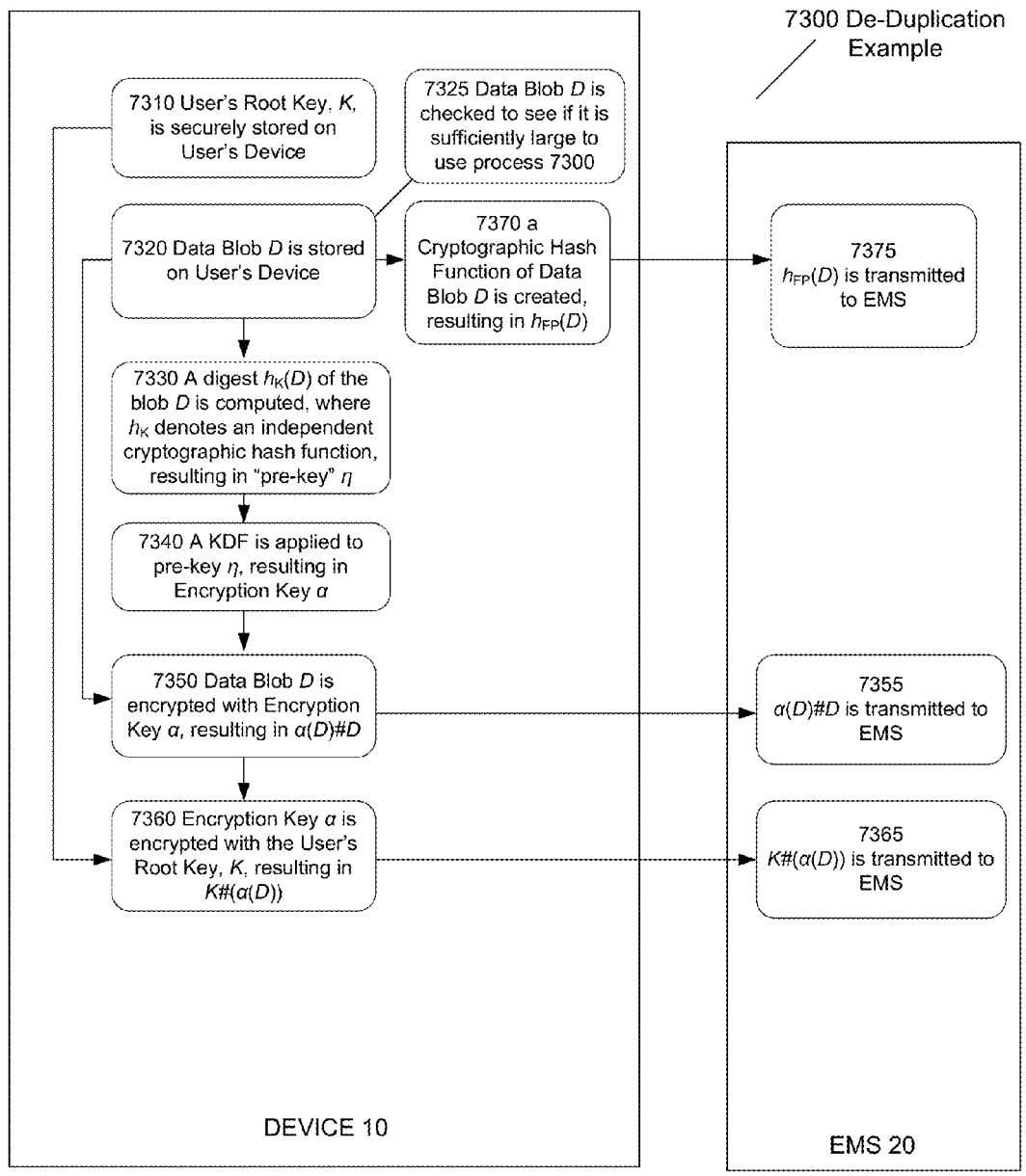
FIG. 7A is a flow diagram of a system in accordance with various example embodiments of the invention.

In various embodiments, the system solves the problem as follows. Suppose the user wishes to securely store a data blob D on EMS 20, such as shown in FIG. 7A at step 7320. As described previously and shown at steps 7330-7355, this data D is encrypted with an encryption key $\alpha$, and the result, $\alpha\#D$, is transferred to EMS 20 for storage (see also, step 5250 in FIG. 5 and step 6200 in FIG. 6, and corresponding descriptions). As further illustrated in FIG. 7A, in order to facilitate de-duplication or "de-dup," a second quantity is also transferred to EMS 20, in association with the encrypted blob. This quantity is the message digest (or "fingerprint") of D, computed using a cryptographic hash function denoted herein as $h_{FP}$. That is, the "fingerprint" of D is $h_{FP}(D)$, as shown in step 7370. A third quantity is computed and transmitted to EMS for storage in association with $\alpha\#D$, as indicated in step 7350. This third quantity is the key $\alpha$, noted in step 7340, itself encrypted as shown in step 7360 with the user's root key k, identified at step 7310.

The final element of solutions used in various embodiments is the mechanism by which the key $\alpha$ is determined. The key $\alpha$ used to encrypt the blob may be computed as described previously, which for convenience is restated again here with respect to data blob D in example de-duplication system and method 7300: As shown in step 7330, a digest $h_K(D)$ of the blob D may be computed, where $h_K$ denotes an independent cryptographic hash function (independent of $h_{FP}$, discussed herein). The hash (SHA-1 preferred) of the blob D is typically computed on the user's device 10. Any other suitable cryptographic hash function could be used. As noted in step 7330, the result is a "pre-key" $\eta=h_K(D)$. Then as shown in step 7340, the key $\alpha$ is obtained by use of a KDF acting on the pre-key $\eta$. That is, $\alpha=\alpha(D)=KDF(h_K(D))$.

The reasons this method enables private de-duplication is that if a subsequent user intends to securely store a data blob on EMS 20 that coincides, byte-for-byte, with D, then: (1) the system can determine that the new blob is a duplicate of D, by the fact that the fingerprint of the new blob coincides with the fingerprint of D; (2) the user wishing to store the new blob (which coincides with D), has the ability to compute the key with which D is encrypted; and (3) it is not possible for EMS to compute the encryption key $\alpha(D)$.

For security reasons, it is preferable in certain embodiments that for data blobs of a size below some given threshold, a random encryption key be generated, rather than using the deterministic method above. In such embodiments, data blob D is checked at step 7325 to see if it is sufficiently large to use de-duplication process 7300, because short files are not eligible for de-duplication. If step 7325 reveals that data blob D is too short, then a random encryption key may be generated for D, rather than applying de-duplication process 7300. Also $h_{FP}$ and $h_K$ may be independent cryptographic hash functions. In certain embodiments the hash functions $h_{FP}$=SHA-1 and $h_K$=SHA-2/256 are used.

Example De-Duplication

In one example embodiment 7000 the system supports three users, Alice, Bob and Charlie. At a certain point in time, two data blobs $D_1$ and $D_2$ (e.g., files) stored on EMS 20. In this example, access to these two blobs $D_1$ and $D_2$ has been allowed and disallowed to the three users as indicated in Table 1, shown in FIG. 7B. If the users' root keys in this example are denoted by $K_A$, $K_B$ and $K_C$, respectively, chart 7200 illustrates the data that would be stored in the database of the EMS 20.

As previously indicated, it is usually preferred in typical embodiments that small files be ineligible for de-duplication. Databases in the EMS 20 should include means to indicate whether each data blob D is eligible for de-duplication. This can be accomplished with, for example, a separate field provided in the "blob table" (assuming a relational database). Alternatively, ineligibility for de-duplication could be indicated with a null fingerprint, or any other suitable means. Likewise, any suitable database design may be used. Specific designs for databases in EMS 20 will be apparent to persons of skill in the art and are not further described here.

Private File Versioning

In the following description the term "logical file" will be used to denote a logical byte array. From any given file on any user device 10, the associated logical file is simply the byte array represented on a disk or other data storage medium. The logical file does not contain inode information. Similarly, a "logical file history" is conceptually a finite, ordered set of logical files, each one (except the zeroth or first) representing one version beyond the previous version. For purposes of illustrating the concept, disclosed herein are two example options for file versioning that may be used with the present system.

For clarity in the following description, encryption of data blobs (both files and patches) sent to and from, and maintained on, the EMS 20 is not explicitly indicated, as those steps have been described previously. It is understood that all user files (and all file diff/patch blobs) are typically encrypted. Note that in principle each file or patch is a "data blob" that can be independently de-duplicated, if desired; however, it may make sense to only make original file versions (for method #1 below), or current file versions (for method #2 below), eligible for de-duplication. Both of these example methods perform all file differentials or "diffs" on the user's device 10 (rather than on EMS 20), enabling EMS 20 to remain ignorant of the user's file content.

Described below are two examples of versioning. In the first example, an original version of the logical file is stored as $F_0$ and patch instructions are applied to $F_0$ to arrive at the current version of the file, or any version prior to the current version. In the second example, the current version of the logical file is stored as $F_N$ and patch instruction are applied to $F_N$ to back out changes made in various versions to arrive at the desire version. These two examples provide the extreme cases for versioning disclosed herein. It would be apparent to one of skill in the art that a version of the logical file between the original $F_0$ and the current $F_N$ could be selected as the starting point designated as $(F_{N-X})$ and patches could be applied to bring the starting version $F_{N-X}$ to more current versions, or patches could be backed out to bring to earlier versions.

Versioning Example Method #1

If $F_0$ is the original version of logical file F, and all subsequent versions are denoted $F_i$, example versioning method #1 8000, illustrated in FIG. 8, stores the following (encrypted in a manner discussed below): $\{F_0, P_{i,i+1} | i \geq 0\}$. The Nth version of the logical file is obtained as follows: $F_N = P_{N-1,N} \circ \ldots \circ P_{1,2} \circ P_{0,1}(F_0)$.

$P_{m,n}$ is used to denote the set of patch instructions required to patch version m to version n, and also $P_{m,n}$ is used to denote the function, which when applied to version m of the logical file (byte array) will result in version n of the logical file (again, a byte array).

Figure 8:
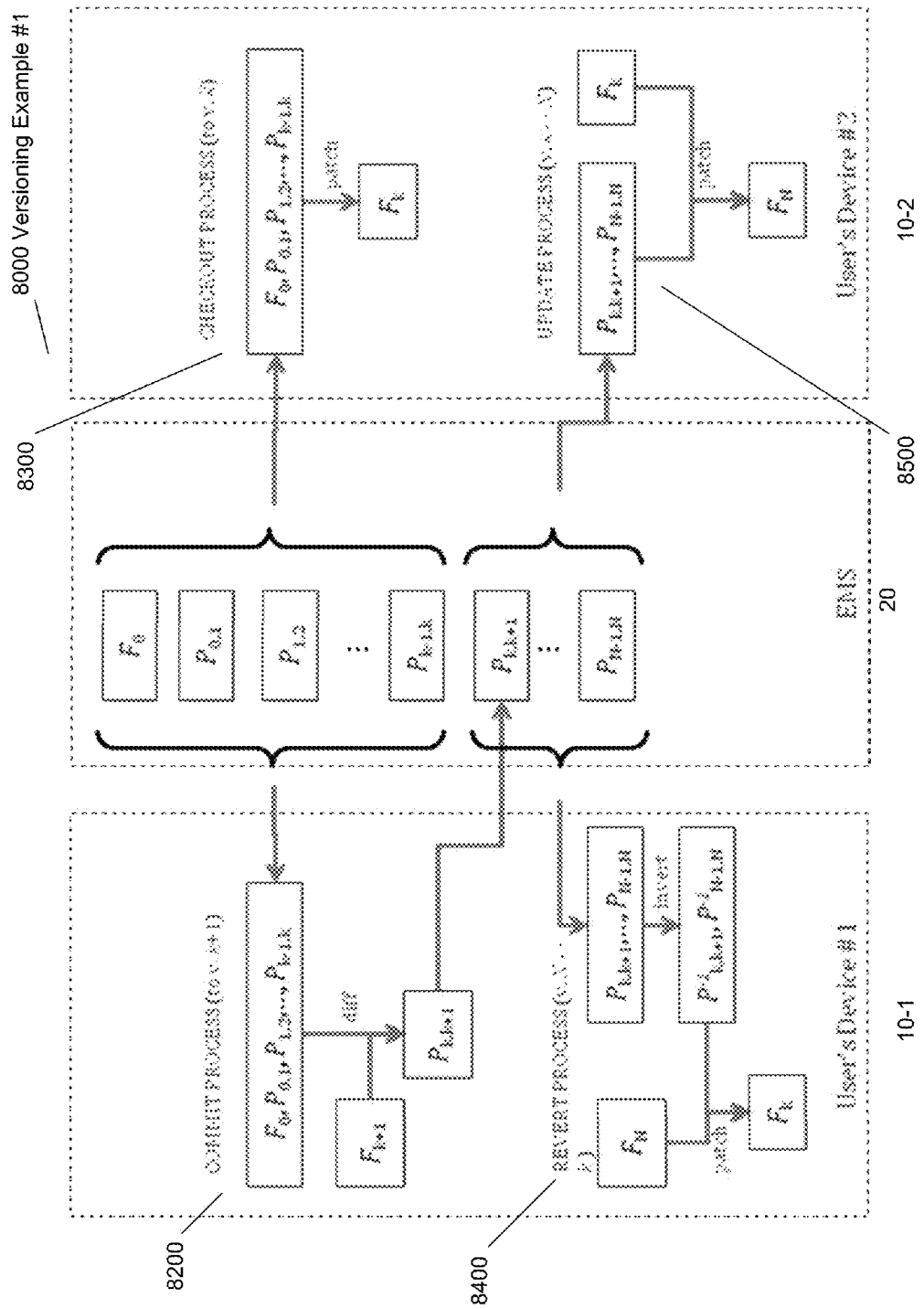
FIG. 8 is a flow diagram of a system in accordance with various example embodiments of the invention.

In accordance with the foregoing definitions and description, FIG. 8 illustrates example high-level operations required to perform the following actions:

Step 8200, Commit: when a new version is committed by a client, the local (modified) file becomes the current version. The client downloads the original version $F_0$, and the patches to the kth version, and creates the kth version as follows: $F_K = P_{k-1,k} \circ \ldots \circ P_{1,2} \circ P_{0,1}(F_0)$. The client then performs whatever revision is wants to the kth version, creates a patch and uploads the patch corresponding to the latest changes to the EMS 20.

Step 8300, Checkout: when version k of a logical file is checked out, the client downloads the original version $F_0$, and the patches to the kth version, and creates the kth version as follows: $F_K = P_{k-1,k} \circ \ldots \circ P_{1,2} \circ P_{0,1}(F_0)$. This assumes that the user's device 10, or client, does not have any version of the logical file of interest. If the user's device 10 did have such a version, then the client could simply download the patches from the current version to the desired checkout version and apply those patches to the version currently stored on the client. The client does not upload anything to the EMS 20 during checkout.

Step 8400, Revert: if a user's device 10, or client, has version N of a logical file, and wishes to replace it with version k<N, the client is said to revert the file to version k. Since the client already has a version N of the file, the client needs to download the patches from k to N, which it inverts and applies those inverted patches as $F_k = P_{k+1,k} \circ \ldots \circ P_{N-1,N-2} \circ P_{N,N-1}(F_N)$. The client does not upload anything to the EMS 20 during revert.

Step 8500, Update: if a user's device 10, or client, has version k of a logical file, and wishes to update that file to version N>k (on EMS 20), the client is said to update from version k to version N. Since the client already created the kth version of the file stored, the client needs to download the patches from k to N and applies those patches as $F_N = P_{N-1,N} \circ \ldots \circ P_{k,k+1}(F_k)$. The client does not upload anything to the EMS 20 during update.

Versioning Example Method #2

Figure 9:
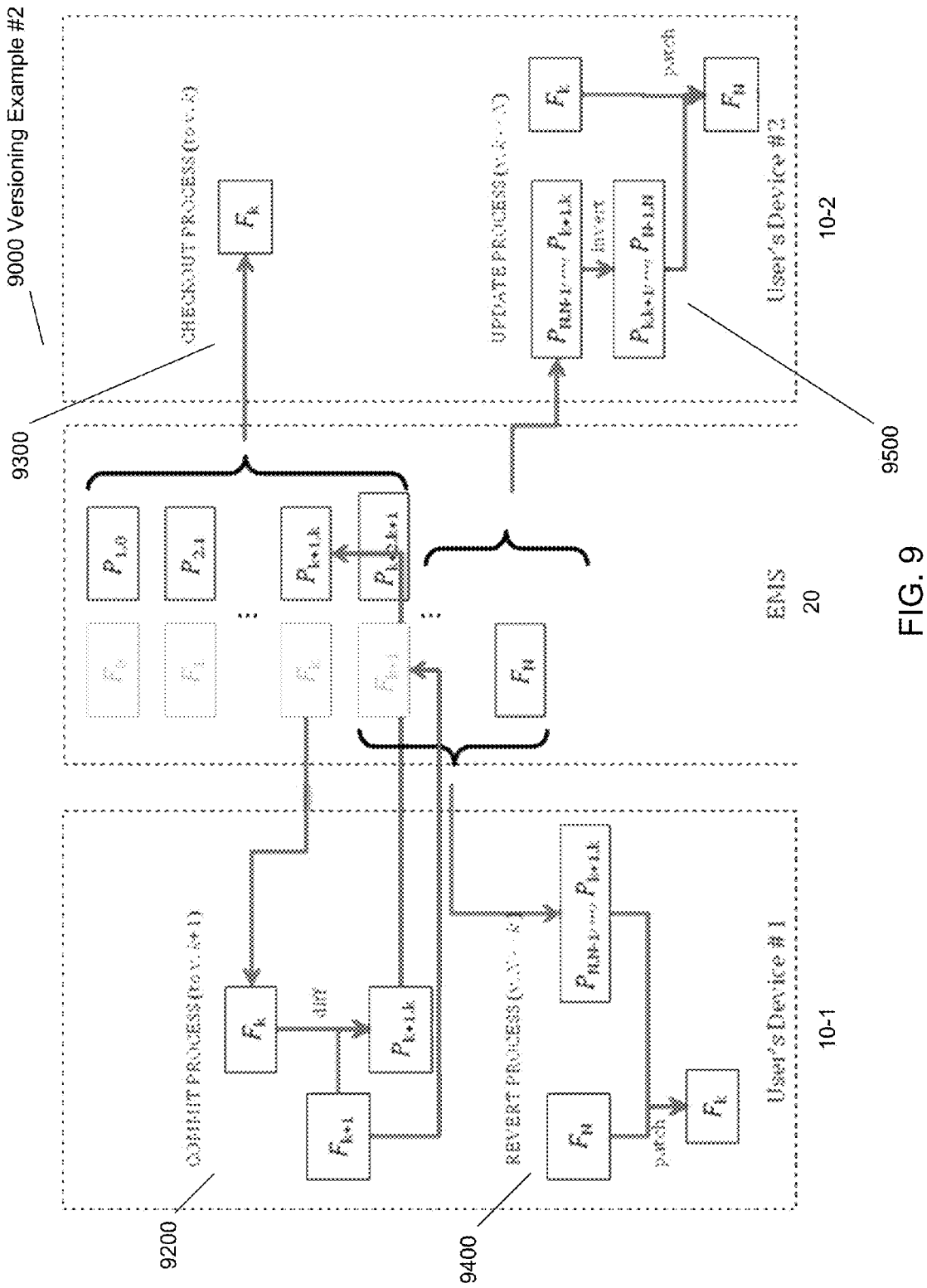
FIG. 9 is a flow diagram of a system in accordance with various example embodiments of the invention.

If $F_N$ is the current version of logical file F, and all previous versions are denoted $F_i$, example versioning method #2 9000, illustrated in FIG. 9, stores the following (encrypted in a manner discussed below): $\{F_N, P_{i+1,i} | N-1 \geq i \geq 0\}$. In accordance with the foregoing definitions and description, FIG. 9 illustrates example high-level operations required to perform the following actions:

Step 9200, Commit: when a new version is committed by a client, the local (modified) file becomes the current version. The client downloads the current version $F_k$ from the EMS 20. The client then performs whatever revision it wants to the kth version, creates a patch and uploads the patch and the new version $F_{k+1}$ to the EMS 20.

Step 9300, Checkout: when version k of a logical file is checked out, version $F_N$ is downloaded from EMS 20 to the user's device 10, along with all the patches (i.e., N–k patches) to arrive at version $F_k$. This assumes that the user's device 10, or client, does not have any version of the logical file of interest. If the user's device 10 did have such a version, then the client could simply download the patches from the current version to the desired checkout version and apply those patches to the version currently stored on the client. Version k of the logical file is obtained as follows: $F_k = P_{k+1,k} \circ \ldots \circ P_{N-1,N-2} \circ P_{N,N-1}(F_N)$. In other words, the desired version is obtained by applying the patches from the most current version of the logical file $F_N$. (note the patches here are the inverted patches from method #1). This is different from versioning method #1 described above because in that method the desired version is obtained by starting with the original version and applying all the patches until the desire version is reached. The client does not upload anything to the EMS 20 during checkout.

Step 9400, Revert: if a user's device 10, or client, has version N of a logical file, and wishes to replace it with version k<N, the client is said to revert the file to version k. Since the client already downloaded the current version $F_N$, the client needs to download the patches to arrive at the changes to the kth version. Then the client can apply those patches as $F_k = P_{k+1,k} \circ \ldots \circ P_{N-1,N-2} \circ P_{N,N-1}(F_N)$. The client does not upload anything to the EMS 20 during revert.

Step 9500, Update: if a user's device 10, or client, has version k of a logical file, and wishes to update that file to version N (on EMS 20), the client is said to update from version k to version N. Since the client already has a version of the file stored, the client needs to download the patches to update the changes to the Nth version, and must invert those patches. Then the client can apply those inverted patches as $F_N = P_{N-1,N} \circ \ldots \circ P_{k,k+1}(F_k)$. The client does not upload anything to the EMS 20 during update.

FIG. 10 provides a comparison 10000 of the corresponding steps 8200-8500, and 9200-9500, respectively, of versioning method #1 8000 and versioning method #2 9000. Comparison 10000 indicates what data must be uploaded to, and downloaded from, EMS 20 for each operation of interest. The choice on which method to use depends on the system requirements and desired performance. For example, the system may want to make available only five previous versions of a particular file. This could be implemented by using method #2, and allowing the maximum number of inverted patches to be five. And since most users usually download the most current version of a file, method #2 with a limit of five patches not only reduces the amount of memory that must be allocated to each file, but also allows the client to use the current version without wasting resources in applying patches to arrive at the most current version as would be required in method #1.

Of course a particular user may require prior versioning on a regular basis, and may require those versions to be earlier than five previous versions. In such a case, method #2 may not be optimal for the system resources, rather method #1 might be better or method #2 with more than five inverted patches stored. Alternatively, a hybrid between methods #1 and #2 may be optimal where a logical file $F_K$ is stored along with patches flanking both in the more current version direction and the previous direction. The system can be dynamic enough to identify the current and historical needs of a particular user, and adapt the versioning method to optimize the system.

Example Incorporating Privacy and De-Duplication

The above descriptions of versioning do not explicitly indicate encryption and de-duplication. The following example should clarify how encryption and de-duplication are accomplished, along with versioning. For the sake of brevity, only an example of the commit process commit is provided, and only for versioning method #2. From this example, all other cases will be readily apparent to a person of skill in the art.

Detailed Example of Versioning Method #2—Commit Step 9200

In this example a logical file F is at version k. $F_k$ is stored on the user's device 10. On EMS 20, the following three quantities are stored (in a simple database structure): (1) $h_k$, the fingerprint of $F_k$ as previously described, for instance with respect to FIGS. 6 and 7; (2) $\alpha_k \# F_k$, where $F_k$ encrypted is with symmetric key $\alpha_k$; and (3) $K\#\alpha_k$, the symmetric key $\alpha_k$ encrypted with the user's root key K. Patches to previous versions are also securely stored on EMS 20.

On the user's device 10, the local version of the file is modified. The modified file may be denoted by $F^*$. With reference to the steps and structure shown in FIG. 9, a new version (version k+1) may be synchronized with EMS 20 as follows:

1. The device 10 (e.g., User's Device #1 in FIG. 9) requests version k of the file from EMS 20. This request contains a file history identifier. This is simply an identifier that is unique across the system; it could be a database primary key, a UUID, or the like. The request also contains the version number requested (i.e., k).
2. The response from EMS 20 contains $\alpha_k \# F_k$ and $K\#\alpha_k$.
3. The device 10 deciphers $\alpha_k$ using the user's root key K.
4. The device 10 deciphers $F_k$ using $\alpha_k$.
5. The device 10 computes the patch $P_{k+1,k}$; this contains instructions required to obtain $F_k$ from the new (modified) file $F^*$ (which is to become $F_{k+1}$).
6. The device 10 sends the patch to EMS 20:
    a. If the system is designed to enable de-duplication for patches and the size of $P_{k+1,k}$ is above the de-duplication threshold, the device computes the fingerprint of $P_{k+1,k}$ as described in the text describing FIGS. 6 and 7. This fingerprint is denoted $h_{k+1,k}$.
    b. The device 10 generates the key $\alpha_{k+1,k}$ used to encipher $P_{k+1,k}$. If the system is designed to enable de-duplication for patches and the size of $P_{k+1,k}$ is above the de-duplication threshold, then $\alpha_{k+1,k}$ (i.e., the key) is computed from the patch as described in the text describing FIGS. 6 and 7. Otherwise, $\alpha_{k+1,k}$ is generated at random.
    c. The device enciphers $\alpha_{k+1,k}$ with the user's root key K, thereby obtaining $K\#\alpha_{k+1,k}$.
    d. If the size of $F_{k+1}$ is below the de-duplication threshold, the device computes the fingerprint of $F_{k+1}$ as described in the text describing FIGS. 6 and 7. Denote this fingerprint by $h_{k+1}$.
    e. The device generates the key $\alpha_{k+1}$ used to encipher $F_{k+1}$. If the size of $F_{k+1}$ is above the de-duplication threshold, then $\alpha_{k+1}$ is computed from $F_{k+1}$ as described in the text describing FIGS. 6 and 7. Otherwise, $\alpha_{k+1}$ is generated at random.
    f. The device enciphers $\alpha_{k+1}$ with the user's root key K, thereby obtaining $K\#\alpha_{k+1}$.
    g. The device sends a commit command to EMS 20. The commit command contains:
        The file history identifier
        The current version (k) can be sent as a "sanity check".
        Indication whether the patch is eligible for de-duplication
        The fingerprint of the patch: $h_{k+1,k}$ (if eligible)
        The encrypted patch: $\alpha_{k+1,k}\#P_{k+1,k}$
        The encrypted patch key: $K\#\alpha_{k+1,k}$
        Indication whether the new file version is eligible for de-duplication
        The fingerprint of the new file version: $h_{k+1}$ (if eligible)
        The encrypted file: $\alpha_{k+1}\#F_{k+1}$
        The encrypted file key: $K\#\alpha_{k+1}$
7. EMS 20 rolls the file version number:
    a. EMS 20 looks up the file history using the file history identifier
    b. EMS 20 ensures that the current version is at the version (k) provided in the commit command
        If the provided patch is eligible for de-duplication, EMS 20 determines whether the patch fingerprint already exists in the database. If so, it associates the k+1→k patch entry with the existing blob. Otherwise, it associates the k+1→k patch entry with the relevant data provided in the commit command ($h_{k+1,k}, \alpha_{k+1,k}\#P_{k+1,k}$). In either case, EMS 20 stores the encrypted patch key, $K\#\alpha_{k+1,k}$, for future access by the user.
        If the newly-provided file version is eligible for de-duplication, EMS 20 determines whether the associated fingerprint already exists in the database. If so, it associates the version k+1 file with the existing blob. Otherwise, it associates the version k+1 file with the relevant data provided in the commit command ($h_{k+1}, \alpha_{k+1}\#F_{k+1}$). In either case, EMS 20 stores the encrypted file key, $K\#\alpha_{k+1}$, for future access by the user.

The description above is provided a simple example to illustrated the concept, and is not necessarily the preferred data transport protocol. A preferred method may involve a sequence of messages between the device 10 and EMS 20 such that duplicate blobs are not transmitted to EMS 20 (to conserve bandwidth). For example, a preferred method may involve first sending the fingerprint of the k+1 file version to EMS 20. The response from EMS 20 would indicate whether there is already a data blob stored in EMS 20 that corresponds to the k+1 file version. If so, the device 10 would not send the blob. If not, the device 10 would then send the encrypted k+1 file version. In either case, the device 10 would send the associated key (encrypted with the user's root key), as described herein.

While the description above refers to particular embodiments of the present invention, it should be readily apparent to people of ordinary skill in the art that a number of modifications may be made without departing from the spirit thereof. The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein. Moreover, the applicants expressly do not intend that the following claims "and the embodiments in the specification to be strictly coextensive." *Phillips* v. *AHW Corp.*, 415 F.3d 1303, 1323 (Fed. Cir. 2005) (en banc).

The invention claimed is:

1. A de-duplication system comprising:
a first computing device and a second computing device, both devices being adapted and programmed to communicate data to and from each other over a network, the first computing device being further adapted and programmed such that, upon a first request and responsive to determining a first data blob exceeds a predetermined size threshold:
the first computing device encrypts the first data blob using a first key, thereby creating a first encrypted data blob, wherein the first key is generated by applying a key distribution function to a second cryptographic has of the first data blob, independent of other cryptographic hashes;
the first computing device cryptographically hashes the first data blob, thereby creating a first cryptographic hash of the first data blob independent of the second cryptographic hash;
the first computing device encrypts the first key, using a first root key, thereby creating a first encrypted key;
the first computing device communicates to the second computing device: the first encrypted data blob; the first cryptographic hash of the first data blob; and the first encrypted key, wherein when it is determined the first data blob does not exceed the predetermined size threshold the first key is randomly generated and a null cryptographic hash is associated with the first data blob;
the second computing device being further adapted and programmed such that, after receipt of the first encrypted data blob, the first cryptographic hash of the first data blob, and the first encrypted key from the first device, the second computing device will:
recognize when it receives a second request to receive a second encrypted data blob that coincides byte-for-byte with the first encrypted data blob;
deny the second request; and
provide to the second requester access to first encrypted data blob.

2. The de-duplication system of claim 1, wherein the second computing device is further adapted and programmed such that, when it receives a second request to receive a second encrypted data blob that coincides byte-for-byte with the first encrypted data blob, the second computing device will:
recognize when it receives a second request to receive a second encrypted data blob that coincides byte-for-byte with the first encrypted data blob by comparing the first cryptographic hash of the first data blob to the first cryptographic hash of a second data blob.

3. The de-duplication system of claim 1, wherein the second computing device is further adapted and programmed such that, when it receives a second request to receive a second encrypted data blob that coincides byte-for-byte with the first encrypted data blob, the second computing device will:
deny the second request when the second computing device determines that the second requester can compute the first key with which the first encrypted data blob is encrypted.

4. The de-duplication system of claim 1, wherein the second computing device is further adapted and programmed such that, when it receives a second request to receive a second encrypted data blob that coincides byte-for-byte with the first encrypted data blob, the second computing device will:
provide to the second requester access to the first encrypted data blob.

5. The de-duplication system of claim 1, wherein the second computing device cannot compute the first key with which the first encrypted data blob is encrypted.

6. The de-duplication system of claim 1, wherein the first computing device and the second computing device are further adapted and programmed such that the system operates as claimed when the first request and the second request come from different computing devices.

7. The de-duplication system of claim 1, wherein the first computing device and the second computing device are further adapted and programmed such that the system operates as claimed when the first request and the second request come from the same computing device.

8. The de-duplication system of claim 1, wherein the first computing device and the second computing device are further adapted and programmed such that the system operates as claimed when the first request and the second request come from computing devices that both store the first root key.

9. The de-duplication system of claim 1, wherein the first computing device and the second computing device are further adapted and programmed such that the system operates as claimed when the first request and the second request come from computing devices that do not both store the first root key.

10. The de-duplication system of claim 1, wherein the second computing device comprises a plurality of computers.

11. A method of de-duplication operable on a first computing device and a second computing device when both devices are adapted and programmed to communicate data to and from each other over a network and to perform the following respective steps, comprising the following steps:
responsive to determining a first data blob exceeds a predetermined size threshold the first computing device encrypts the first data blob using a first key, thereby creating a first encrypted data blob, wherein the first key is generated by applying a key distribution function to a second cryptographic has of the first data blob, independent of other cryptographic hashes;

the first computing device cryptographically hashes the first data blob, thereby creating a first cryptographic hash of the first data blob independent of the second cryptographic hash;

the first computing device encrypts the first key, using a first root key, thereby creating a first encrypted key;

the first computing device communicates to the second computing device: the first encrypted data blob; the first cryptographic hash of the first data blob; and the first encrypted key, wherein when it is determined the first data blob does not exceed the predetermined size threshold the first key is randomly generated and a null cryptographic hash is associated with the first data blob;

the second computing device, after receipt of the first encrypted data blob, the first cryptographic hash of the first data blob, and the first encrypted key from the first device:

recognizing when it receives a second request to receive a second encrypted data blob that coincides byte-for-byte with the first encrypted data blob;

denying the second request; and providing to the second requester access to first encrypted data blob.

12. The de-duplication method of claim 11, wherein the second computing device, when it receives a second request to receive a second encrypted data blob that coincides byte-for-byte with the first encrypted data blob:

recognizes when it receives a second request to receive a second encrypted data blob that coincides byte-for-byte with the first encrypted data blob by comparing the first cryptographic hash of the first data blob to the first cryptographic hash of a second data blob.

13. The de-duplication method of claim 11, wherein the second computing device, when it receives a second request to receive a second encrypted data blob that coincides byte-for-byte with the first encrypted data blob, will:

deny the second request when the second computing device determines that the second requester can compute the first key with which the first encrypted data blob is encrypted.

14. The de-duplication method of claim 11, wherein the second computing device, when it receives a second request to receive a second encrypted data blob that coincides byte-for-byte with the first encrypted data blob, will:

provide to the second requester access to the first encrypted data blob.

15. The de-duplication method of claim 11, wherein the second computing device does not compute the first key with which the first encrypted data blob is encrypted.

16. The de-duplication method of claim 11, wherein the first computing device and the second computing device are further adapted and programmed such that the method operates as claimed when the first request and the second request come from different computing devices.

17. The de-duplication method of claim 11, wherein the first computing device and the second computing device are further adapted and programmed such that the method operates as claimed when the first request and the second request come from the same computing device.

18. The de-duplication method of claim 11, wherein the first computing device and the second computing device are further adapted and programmed such that the method operates as claimed when the first request and the second request come from computing devices that both store the first root key.

19. The de-duplication method of claim 11, wherein the first computing device and the second computing device are further adapted and programmed such that the method operates as claimed when the first request and the second request come from computing devices that do not both store the first root key.

20. A de-duplication system comprising:

first computing means and second computing means, both computing means being adapted and programmed to communicate data to and from each other over a network, the first computing device being further adapted and programmed such that, upon a first request and responsive to determining a first data blob exceeds a predetermined size threshold;

the first computing means encrypts the first data blob using a first key, thereby creating a first encrypted data blob, wherein the first key is generated by applying a key distribution function to a second cryptographic hash of the first data blob, independent of other cryptographic hashes;

the first computing means cryptographically hashes the first data blob, thereby creating a first cryptographic hash of the first data blob independent of the second cryptographic hash;

the first computing means encrypts the first key, using a first root key, thereby creating a first encrypted key;

the first computing means communicates to the second computing means: the first encrypted data blob; the first cryptographic hash of the first data blob; and the first encrypted key, wherein when it is determined the first data blob does not exceed the predetermined size threshold the first key is randomly generated and a null cryptographic hash associated with the first data blob;

the second computing means being further adapted and programmed such that, after receipt of the first encrypted data blob, the first cryptographic hash of the first data blob, and the first encrypted key from the first device, the second computing means will:

recognize when it receives a second request to receive a second encrypted data blob that coincides byte-for-byte with the first encrypted data blob;

deny the second request; and provide to the second requester access to first encrypted data blob.

21. The de-duplication method of claim 11, wherein the second computing device comprises a plurality of computers.

* * * * *